United States Patent
Nitzschke et al.

(10) Patent No.: US 6,318,211 B1
(45) Date of Patent: Nov. 20, 2001

(54) 12-SPEED GEAR BOX WITH A 2×3×2 CONSTRUCTION

(75) Inventors: Rüdiger Nitzschke, Langenargen; Bernd Schepperle, Constance, both of (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 09/554,505

(22) PCT Filed: Nov. 23, 1998

(86) PCT No.: PCT/EP98/07561

§ 371 Date: May 15, 2000

§ 102(e) Date: May 15, 2000

(87) PCT Pub. No.: WO99/28654

PCT Pub. Date: Jun. 10, 1999

(30) Foreign Application Priority Data

Nov. 29, 1997 (DE) ............................................. 197 53 061

(51) Int. Cl.⁷ ............................... F16H 3/02; F16H 57/00
(52) U.S. Cl. .................................................. 74/745; 74/335
(58) Field of Search ........................................ 74/335, 745

(56) References Cited

U.S. PATENT DOCUMENTS

| | | | |
|---|---|---|---|
| 4,876,924 | * 10/1989 | Fletcher et al. | 74/745 |
| 4,966,048 | * 10/1990 | Braun | 74/745 |
| 5,385,066 | * 1/1995 | Braun | 74/745 X |
| 5,396,563 | * 3/1995 | Stine | 74/745 X |
| 5,416,698 | * 5/1995 | Hutchison | 74/335 X |
| 5,471,893 | * 12/1995 | Newbigging | 74/335 |
| 5,511,437 | * 4/1996 | Braun | 74/745 X |
| 5,537,894 | * 7/1996 | Chan | 74/745 |
| 5,791,189 | * 8/1998 | Newbigging | 74/335 |
| 5,819,601 | * 10/1998 | Kuhn | 74/745 |

FOREIGN PATENT DOCUMENTS

| | | |
|---|---|---|
| 28 54 747 | 6/1979 | (DE) . |
| 38 40 403 A1 | 7/1989 | (DE) . |
| 0 317 094 A2 | 5/1989 | (EP) . |
| 2 108 603 A | 5/1983 | (GB) . |

OTHER PUBLICATIONS

Looman, Johannes: Zahnradgetriebe: "Grundlagen, Konstruktionen, Anwendungen in Fahrzeugen". Heidelberg, Germany: Springer–Verlag Berlin, 1996, pp. 257–267.

* cited by examiner

Primary Examiner—Charles A Marmor
Assistant Examiner—Roger Pang
(74) Attorney, Agent, or Firm—Davis & Bujold, PL.L.C.

(57) ABSTRACT

To obtain in a 12-speed transmission for utility vehicles in 2×3×2 construction moving a logical shift diagram by alternating shifting movements back and forth with a continuously increasing or decreasing gear sequence, the two gear steps of the front-mounted section (GV) are manually shifted alternate for each gear step of a pneumatically shifted main section (GR). The rear steps of the main section (GH) are activated pneumatically by activating devices (S1, S2, S3) when changing from one to the next gear step. The transition from the slow to fast step (L, S) of each gear step is automatically carried out pneumatically by the rear-mounted section (GP).

5 Claims, 2 Drawing Sheets

12-SPEED GEAR BOX WITH A 2×3×2 CONSTRUCTION

BACKGROUND OF THE INVENTION

The invention relates to a 12-speed transmission for utility vehicles in 2×3×2 construction.

Such 12-speed transmissions consist of a front-mounted or split section, a 3-gear main section and a rear-mounted or range section wherein each section has pneumatically or manually actuated shifting devices. The front-mounted and rear-mounted sections are usually pneumatically actuated while the main section is manually shifted. For the manual shift, shifting devices are used which are based on those of 16-speed transmissions. However, the shift diagram that results has a blank, i.e. the shift diagram does not allow any uninterrupted complete shifting of the gears with movements alternating in direction. From the third to the fourth gear, the selector lever, after disengaging the third gear, has to be shifted in the same direction again as in the engagement of the third gear. Thereafter the fifth gear is switched by a direct opposite movement. As a result of this, a shift blank is formed between the second and fifth gear. Such a shift diagram is illogical as to the movement sequence and makes the control of the shifting device difficult or, at least, is unusual.

The problem to be solved by the invention is to modify a 12-speed transmission in 2×3×2 construction so as to obtain a conventional logical shift diagram without shift blanks.

SUMMARY OF THE INVENTION

Pursuant to the invention accordingly," with and contrary to the prior art, the 3-gear main section is not manually shifted and the split or front-mounted and the range or rear-mounted section are automatically shifted pneumatically and it is only the front-mounted section which is manually shifted. The pneumatic shifting devices for the main section and the rear-mounted sections are manually activated when changing from one gear to the next.

For the front-mounted section is preferably provided with a manually actuated shifting device having gates for six forward gears and at least one reverse gear in which, during continuously increasing and decreasing speed sequences, alternatively accesses the two gears of the front-mounted group. For the main section and the rear-mounted section, pneumatic shifting devices are provided which, during selection of the manual shifting device, are correspondingly activated in the gate of the desired gear. The shift diagram thus obtained corresponds to that of a customary 6-speed transmission with addition of one or two reverse gears. To shift the forward gears, the selector lever of the shifting device alternatively actuates the two gear steps of the front-mounted section wherein, upon each change of a gear step, a synchronization block of the main section is pneumatically activated. It is important that for each two opposite gears, e.g. the first and second, the third and fourth and the fifth and sixth gears, the same gear step of the main section is pneumatically activated. The other pneumatic shift from the respective slow to the fast step of the individual gears then takes place via the rear-mounted section.

BRIEF DESCRIPTION OF THE DRAWINGS

The invention is explained in detail in an embodiment with the aid of the drawings. The drawings show.

DESCRIPTION OF THE PREFERRED EMBODIMENTS

Figure 1:
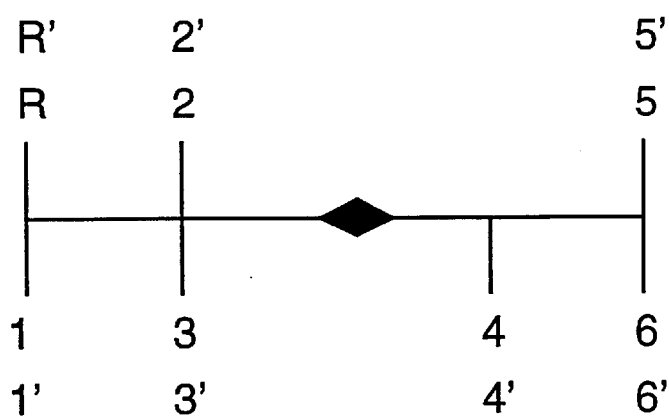
FIGS. 1A, B and C are shift diagrams of a conventionally shifted 12-speed permission in 2×3×2 construction, the desired shift diagram for such a transmission and the shift diagram for a 12-speed transmission, according to the invention, with a diagrammatic representation of the respective gear step shifted.
Figure 1:
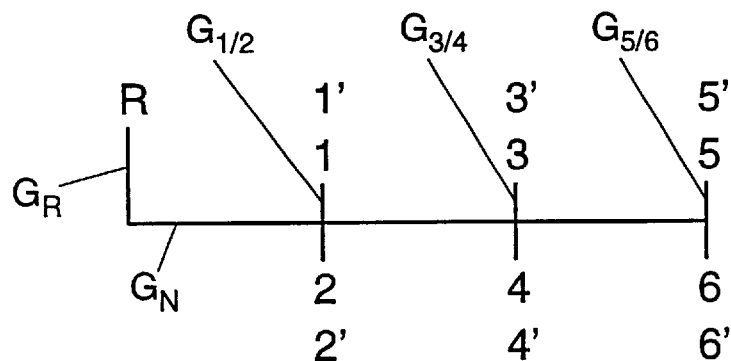
Figure 1:
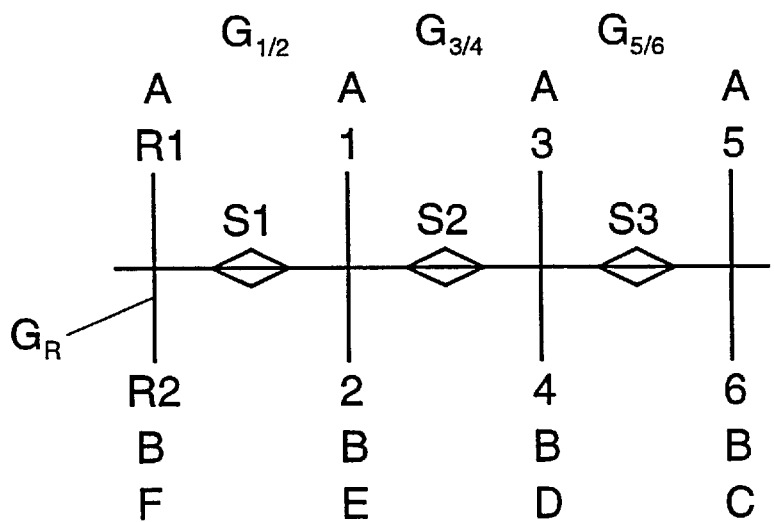

In FIG. 1A is shown the illogical and non-ergonomic shift diagram already described above of a 12-speed transmission in 2×3×2 construction in which the manual shifting device accesses the 3-gear main section and the front-mounted section and the rear-mounted section are pneumatically shifted. The gear blank between the second and fifth gear is clearly seen.

In FIG. 1B is shown the desired shift diagram with a reverse gear, wherein the point of departure is the gear steps 1 to 6 are manually shifted and the gear steps 1' to 6' are pneumatically shifted by the range section as fast steps of the individual gears. The shift diagram has gates $G_R$ for the reverse gear, $G_{1/2}$ for the first and second gear steps, $G_{3/4}$ for the third and fourth gear steps and $G_{5/6}$ for the fifth and sixth gear steps. The gates are transversely interconnected by a neutral gate $G_N$. As indicated in FIG. 1C, activating and shifting devices are placed between the individual gates in the neutral gate, namely, the activating device S1 between the gate for the two reverse gears R1, R2 and the gate for the first and second gear steps, the activating device S2 between the gate for the first and second gear steps and the gate for the third and fourth gear steps, and the activating device S3 between the gate for the third and fourth and the gate for the fifth and sixth gear steps.

Figure 2:
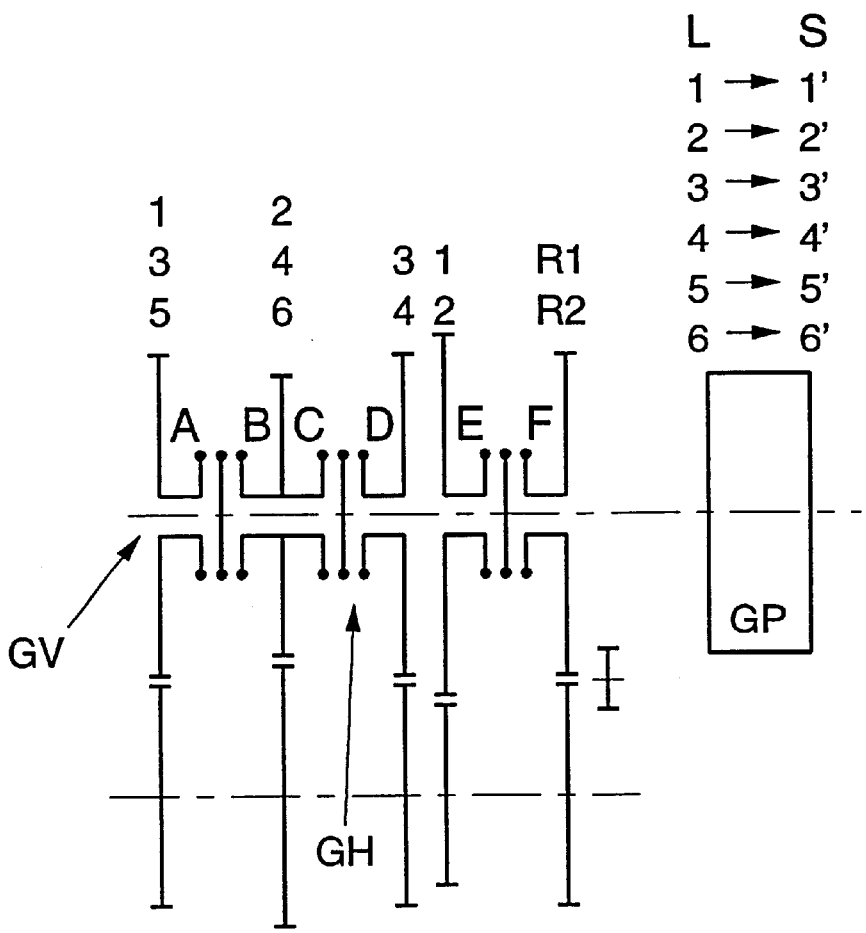
FIG. 2 is a diagrammatic representation of the gear set construction of a 12-speed transmission with one shifting device, according to the invention.

In FIG. 2 is shown the gear set construction of the associated transmission. In the front-mounted section GV are shown two gear steps for the shifts of the first to sixth gear with the appertaining synchronization blocks A, B. To this group attaches the 3-gear main section GH with the synchronization blocks C, D and the blocks E and F combined with the reverse gears R1 and R2. To this is attached the rear-mounted section GP.

Figure 3:
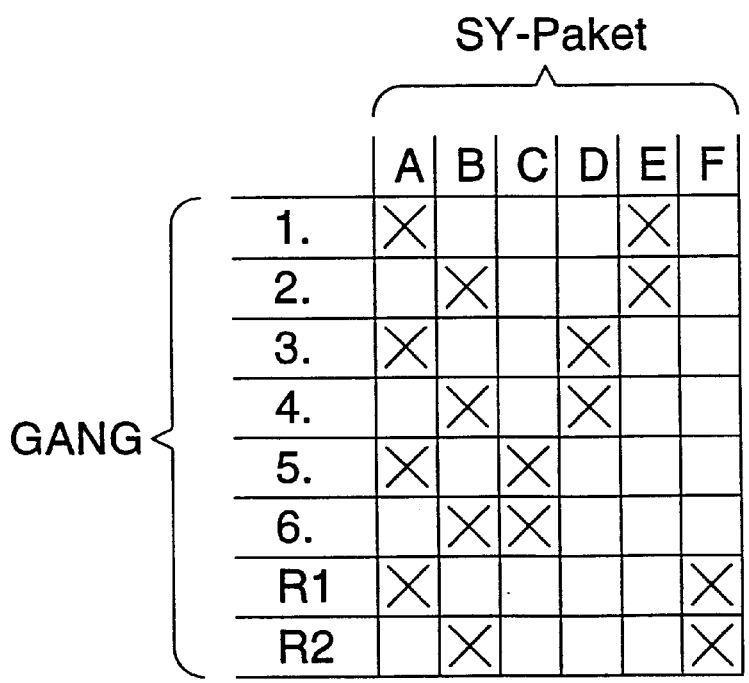
FIG. 3 is a diagram to show the individual shift steps and the corresponding activation of synchronization blocks in the transmission.

In FIG. 3 is shown, for the shift diagram given above in FIG. 1C, a diagram for the forward gears 1 to 6 and the two reverse gears R1 and R2 with the appertaining activated synchronization blocks.

A shift operation from the reverse gear to the sixth gear is described now. From the reverse gear, the second reverse gear R2, the selector lever is located in the gate $G_R$ for both reverse gears. The manual shifting device is meshed with the synchronization block B in the front-mounted section; the synchronization block F is pneumatically activated. When the selector lever is moved to the neutral gate $G_N$ toward the first gear, the engagement in the synchronization block B is first deactivated and then the synchronization block E in the main section $G_H$ is pneumatically activated by the activating device S1. The speed lever is then manually moved to the gate $G_{1/2}$ in the position of the first gear whereby the synchronization block A becomes active. The first gear is thus shifted, the synchronization blocks A and E are in operation. Thereby the slow step L of the first gear is engaged; an automatic shift to the fast step S then takes place automatically pneumatically, by the rear-mounted section GP, as indicated in FIG. 2.

For the change to the second gear, the selector lever is moved in the gate $G_{1/2}$ in the direction toward the second opposite gear whereby the synchronization block A is deactivated and the synchronization block B of the front-mounted section is activated. The synchronization block E of the main section GH still remains activated. A shift from the slow step L of the second gear to the fast step 2' is, in turn, pneumatically controlled by the rear-mounted section GP.

If it has to be shifted to the third gear, the selector lever is moved to the neutral gate $G_N$ whereby the synchronization block B of the front-mounted section is out of operation. While moving the selector lever to the neutral gate in a direction toward the gate $G_{3/4}$, the synchronization block E, via the activating device S2, becomes inoperative and the synchronization block D of the main section GH is set in operation. When changing in third gear, the synchronization block A of the front-mounted section is set in operation so that the shift of the third gear is terminated. A changeover to the fast step occurs, in turn, by the rear-mounted section GP.

In a shift to fourth gear, the selector lever is moved to the gate $G_{3/4}$ whereby in the front-mounted section the synchronization block A becomes inoperative and the synchronization block B is set in operation. The synchronization block D of the main section remains in operation. The changeover from the slow step L to the fast step S of the fourth gear is, in turn, pneumatically controlled by the rear-mounted section E.

When shifting to the fifth or sixth gear, the operation repeats itself so that first the synchronization block B is inoperative and via the activating device S3 the synchronization block A of the front-mounted section and the synchronization block C of the main section GH are set in operation. For shifting of the sixth gear to the gate $G_{5/6}$, shifting is effected on the synchronization block B of the front-mounted section, the synchronization block C of the main section still remaining switched in. A changeover from the slow to the fast step is, in turn, controlled pneumatically by the rear-mounted section GP.

For the described transmission, two reverse gear steps R1 and R2 are provided which, in turn, are shifted by changeover between the synchronization blocks A and B, the synchronization block F for both reverse gear steps remaining operative. It is, of course, possible to block one of the reverse gear steps, such as the reverse gear step R2.

With the manual alternating shifting of both gear steps of the front-mounted section, the whole 12 gears of the transmission can be completely shifted uninterruptedly with alternating shifting devices to a logical shifting movement.

What is claimed is:

1. A 12-speed transmission for utility vehicles in 2×3×2 construction, the transmission comprising:
    one of a 2-speed front section and 2-speed split front section (GV);
    a 3-speed main section (GH); and
    a 2-speed rear-mounted section (GP);
        and the transmission having a manually actuated shifting device and a plurality of pneumatically actuated shifting devices;
        wherein the front section (GV) and the 3-speed main section (GH) provide six forward speeds and at least one reverse gear, the front section (GV) is manually actuated by manual operation of the manual shifting device and the 3-speed main section (GH) is pneumatic actuated by pneumatic operation of the plurality of pneumatically actuated shifting devices, and the rear-mounted 2-speed section (GP) is pneumatically actuated by a pneumatically actuated shifting device to provide the 12-speed transmission.

2. The transmission according to claim 1, wherein the 2-speed rear-mounted section (GP) includes means for automatically shifting the 2-speed rear-mounted section (GP) from a slow speed (L) to a high speed (S).

3. A 12-speed transmission for utility vehicles in 2×3×2 construction, the transmission comprising:
    one of a 2-speed front section and 2-speed split front section (GV);
    a 3-speed main section (GH); and
    a 2-speed rear-mounted section (GP);
        and the transmission having a manually actuated shifting device and a plurality of pneumatically actuated shifting devices;
        wherein the front section (GV) and the 3-speed main section (GH) provide six forward speeds and at least one reverse gear, the front section (GV) is manually actuated by manual operation of the manual shifting device and the 3-speed main section (GH) is pneumatic actuated by pneumatic operation of the plurality of pneumatically actuated shifting devices, and the rear-mounted 2-speed section (GP) is pneumatically actuated by a pneumatically actuated shifting device to provide the 12-speed transmission; and
    the manual shifting device has four gates ($G_{1/2}$, $G_{3/4}$, $G_{5/6}$, $G_R$) for providing the six forward speeds and the at least one reverse speed and alternately actuation of the two speeds of the front section (GV) one of increase and decrease a gear sequence of the transmission, a neutral gate ($G_N$) transversely interconnects each of the four gates, and a manual change of the manual shifting device from one gate to an adjacent gate controls the pneumatic operation of the plurality of pneumatically actuated shifting devices (S1, S2, S3) of the 3-speed main section (GH).

4. The transmission according to claim 3, wherein the 2-speed rear-mounted section (GP) includes means for automatically shifting the 2-speed rear-mounted section (GP) from a slow speed (L) to a high speed (S).

5. A 12-speed transmission for utility vehicles in 2×3×2 construction, the transmission comprising:
    one of a 2-speed front section and 2-speed split front section (GV);
    a 3-speed main section (GH); and
    a 2-speed rear-mounted section (GP);
        and the transmission having a manually actuated shifting device and a plurality of pneumatically actuated shifting devices;
        wherein the front section (GV) and the 3-speed main section (GH) provide six forward speeds and at least one reverse gear, the front section (GV) is manually actuated by manual operation of the manual shifting device and the 3-speed main section (GH) is pneumatic actuated by pneumatic operation of the plurality of pneumatically actuated shifting devices and a manual change of the manual shifting device from one gate to an adjacent gate controls the pneumatic operation of the plurality of pneumatically actuated shifting devices of the 3-speed main section (GH), and the rear-mounted 2-speed section (GP) is pneumatically actuated by a pneumatically actuated shifting device to provide the 12-speed transmission.

* * * * *